(12) United States Patent
Joshi et al.

(10) Patent No.: US 9,736,515 B1
(45) Date of Patent: Aug. 15, 2017

(54) CONVERTING DIGITAL PUBLICATIONS INTO A FORMAT FOR SENDING TO A USER DEVICE

(75) Inventors: Lokesh Joshi, Mercer Island, WA (US); Garett Nell, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 497 days.

(21) Appl. No.: 13/535,193

(22) Filed: Jun. 27, 2012

(51) Int. Cl.
*H04N 21/262* (2011.01)
*G06F 12/00* (2006.01)

(52) U.S. Cl.
CPC ........... *H04N 21/262* (2013.01); *G06F 12/00* (2013.01)

(58) Field of Classification Search
CPC ......... G06F 17/30017; G06F 17/30058; G06F 12/00; H04N 21/262
USPC ................................. 715/720, 716, 744, 249
See application file for complete search history.

(56) References Cited

U.S. PATENT DOCUMENTS

| | | | | |
|---|---|---|---|---|
| 5,438,658 A * | 8/1995 | Fitzpatrick | ........... | G06Q 10/109 715/727 |
| 5,502,576 A * | 3/1996 | Ramsay et al. | ................ | 358/444 |
| 6,567,103 B1 * | 5/2003 | Chaudhry | ......... | G06F 17/30873 707/999.003 |
| 7,725,828 B1 * | 5/2010 | Johnson | ................ | G11B 27/005 715/719 |
| 8,473,846 B2 * | 6/2013 | Ubillos | ............... | G06F 3/04847 715/716 |
| 8,634,705 B2 * | 1/2014 | Yogeshwar et al. | .......... | 386/326 |
| 2003/0052909 A1 * | 3/2003 | Mo | ........................ | G11B 27/034 715/716 |
| 2004/0093220 A1 * | 5/2004 | Kirby | ....................... | G06F 17/27 704/278 |
| 2006/0236245 A1 * | 10/2006 | Agarwal | .............. | G11B 27/034 715/716 |
| 2007/0074115 A1 * | 3/2007 | Patten | .................. | G11B 27/032 715/716 |
| 2007/0102764 A1 * | 5/2007 | Ando | ................ | G11B 20/00086 257/355 |
| 2007/0177466 A1 * | 8/2007 | Ando | .................... | G11B 27/105 369/13.01 |
| 2009/0196575 A1 * | 8/2009 | Masuo | .................. | G11B 27/005 386/278 |
| 2012/0069131 A1 * | 3/2012 | Abelow | ...................... | 348/14.01 |
| 2013/0125171 A1 * | 5/2013 | Sharif-Ahmadi et al. | ...... | 725/43 |
| 2013/0188887 A1 * | 7/2013 | Chan | ........................ | G06K 9/20 382/312 |
| 2015/0135075 A1 * | 5/2015 | Ubillos | ................ | G11B 27/034 715/716 |

\* cited by examiner

*Primary Examiner* — Scott Baderman
*Assistant Examiner* — Hassan Mrabi
(74) *Attorney, Agent, or Firm* — Lowenstein Sandler LLP (57) ABSTRACT

A computing device receives an electronic publication. The computing device determines a layout for the electronic publication based on a display format in which the electronic publication is to be presented. The computing device converts the electronic publication into a streamable format based on the layout. The computing device receives a request to access the electronic publication from a user device. The computing device transmits contents for one or more pages of the converted electronic publication to the user device.

24 Claims, 9 Drawing Sheets

CONVERTING DIGITAL PUBLICATIONS INTO A FORMAT FOR SENDING TO A USER DEVICE

BACKGROUND OF THE INVENTION

Electronic books are viewable on hardware and software electronic book readers. Additionally, in some cases electronic books can be read on personal computers and other computing devices having web browsers using cloud based electronic book readers. However, users are typically not able to read digital books on their televisions.

BRIEF DESCRIPTION OF THE DRAWINGS

The embodiments described herein will be understood more fully from the detailed description given below and from the accompanying drawings, which, however, should not be taken to limit the application to the specific embodiments, but are for explanation and understanding only.

DETAILED DESCRIPTION OF THE PRESENT INVENTION

Methods and systems for converting electronic publications into a streamable format are described herein. In one embodiment, a computing device receives an electronic publication. The electronic publication may be in a non-streamable format and/or may be in a format that is not renderable on a user device such as a television. The computing device determines a layout for the electronic publication based on a display format in which the electronic publication is to be presented. This may include determining a font size, determining a number of characters to include per line of text and/or determining a number of lines of text to include in a page. This may also include dividing the electronic publication into content segments (e.g., pages) that are appropriate for a size and/or resolution of the display. The computing device then converts (e.g., transcodes) the electronic publication into a streamable format that is renderable on a user device based on the layout. In one embodiment, a separate frame is generated for each page. For example, each page may be converted into a separate motion picture experts group (MPEG) video frame. The frames may be arranged into a streamable file that can be streamed to user devices.

To stream an electronic publication to a user device, a computing device receives a selection of a particular electronic publication. The computing device then selects contents (e.g., frames) for one or more pages of the converted electronic publication to send to the user device. The computing device streams these contents, and the user device may present the contents on a display as it would frames of any video or movie. The contents may be unicast to the user device or may be broadcast. Therefore, user devices such as televisions, set top boxes and digital video disc (DVD) players may receive and play digital publications that are not traditionally in streamable formats. This may enable, for example, users to read digital books on their televisions.

As used herein, an electronic publication is an electronic version of a printed publication. Examples of electronic publications include electronic books, electronic magazines, digital newspapers, electronic journals, real simple syndication (RSS) feeds, hypertext markup language (HTML) documents, extensible markup language (XML) documents, extensible hypertext markup language (XHTML) documents, scalable vector graphics (SVG) documents, and so forth. For the purposes of this application, the term element shall be used to describe any component of an electronic publication. The term visual element shall be used to describe objects and other contents of an electronic publication that will be painted to a display. Visual elements may include, for example, images (e.g., art, photographs, etc.), tables, text, video, etc.

Figure 1:
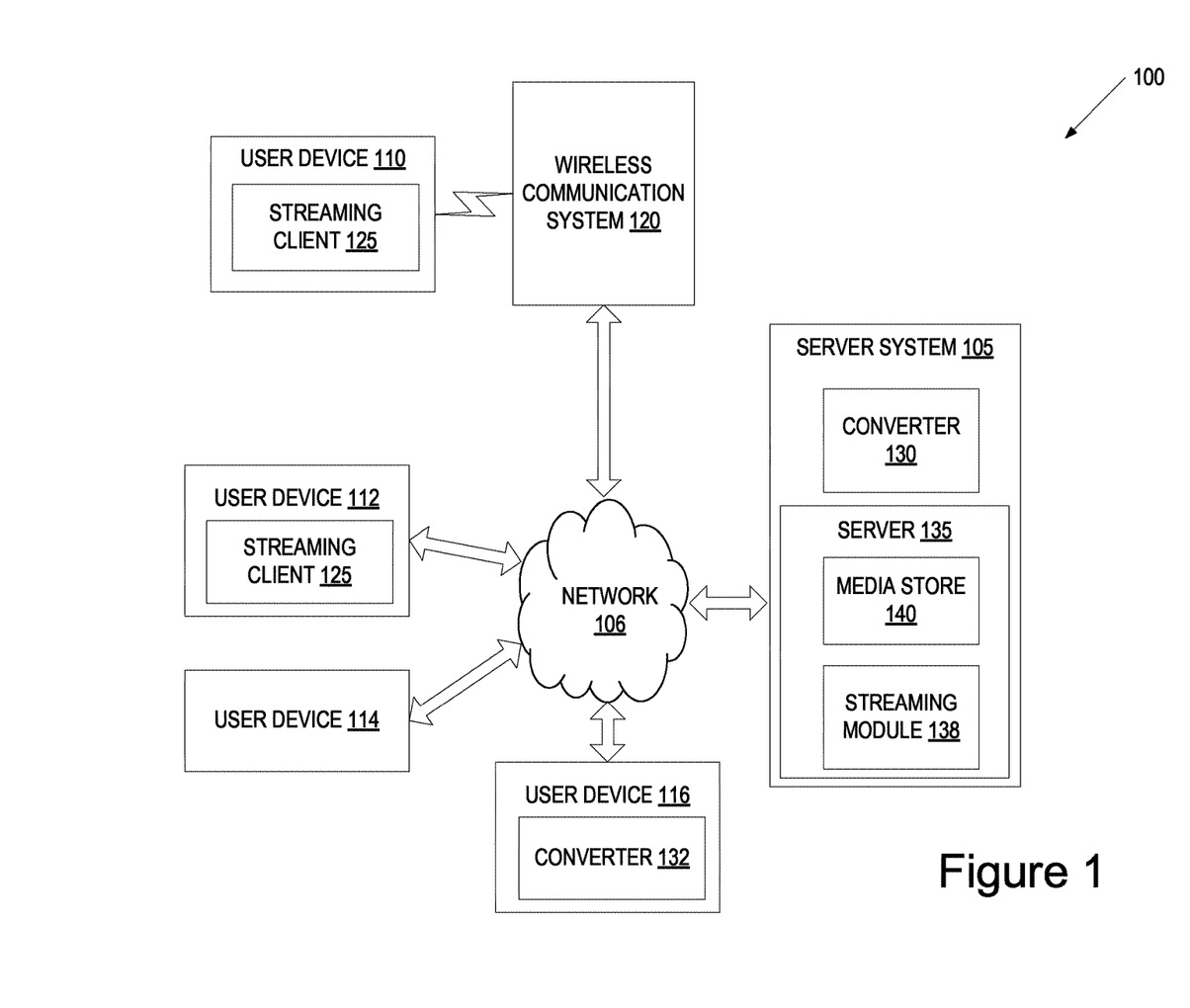
FIG. 1 is a block diagram of an exemplary network architecture, in which embodiments of the present invention may operate.

FIG. 1 is a block diagram of an exemplary network architecture 100, in which embodiments described herein may operate. The network architecture 100 may include a server system 105 and one or more user devices 110, 112, 114, 116 capable of communicating with the server system 105 via a network 106 (e.g., a public network such as the Internet, a private network such as a local area network (LAN), or a combination thereof).

User device 110 may be a portable computing device such as an electronic book reader, notebook computer, mobile phone, tablet computer, personal digital assistant (PDA), portable media player, netbook, and the like. The portable user device 110 may be connected to the network 106 via a wireless communication system 120. The wireless communication system 120 may provide a wireless infrastructure that allows users to use the user device 110 to connect to the network 106, and to purchase items and consume items provided by the server system 105 without being tethered via hardwired links. Wireless communications system 120 may be a wireless fidelity (WiFi) hotspot connected with the network 106. Wireless communication system 120 may alternatively be a wireless carrier system (e.g., as provided by Verizon®, AT&T®, T-Mobile®, etc.) that can be implemented using various data processing equipment, communication towers, etc. Alternatively, or in addition, the wireless communication system 120 may rely on satellite technology to exchange information with the user device 110.

The user devices 112-116 may be non-portable computing devices such as a desktop computer, a set-top box, a television, a gaming console, a digital video disc (DVD) player, a Blu-Ray® player, a digital video recorder (DVR), a digital video player, and so on. Such user devices 112-116 may be connected to the network 106 via hardwire links. Alternatively, such user devices 112-116 may be connected to the network 106 via a wireless communication system 120.

User devices 110-116 may request electronic publications from server system 105, and may receive those electronic publications in a multimedia stream. With streaming, a client can start displaying data before an entire file or complete collection of data is obtained. Radio and television are inherently streaming delivery systems, while conventional books are inherently non-streaming delivery systems.

In one example, user device 114 may be a conventional television that is equipped to process signals that are formatted according to the national television system committee (NTSC), advanced television system committee (ATSC), ATSC-mobile/handheld (ATSC-M/H), digital video broadcasting (DVB), digital multimedia broadcasting (DMB), integrated services digital broadcasting (ISDB), sequential color with memory (SECAM), and/or phase alternating line (PAL) standards, each of which are television streaming standards. The ATSC standard is a digital video standard that supports a number of display resolutions, aspect ratios and frame rates. For the ATSC standard, video may be encoded using motion picture experts group 2 (MPEG-2) encoding. The user device 114 may then decode and display contents of the streamed electronic publication using, for example, an analog or digital television tuner module (not shown). A digital television tuner module may include a hardware MPEG video decoder.

In one embodiment, user devices 110 and 112 are configured with a streaming client 125 to enable the viewing of electronic publications. The streaming client 125 may communicate with a server 135 hosted by the server system 105 to receive streamed electronic publications. Streaming client 125 may receive the electronic publications in any digital streamable format. Therefore, in addition to being able to receive data that is encoded using the ATSC and/or MPEG format, the streaming client 125 may also receive data that has been encoded in the Windows Media®, Real Media®, Quicktime®, MPEG-4 (also known as MP4) or Flash® video file formats, for example. Streaming client 125 may then convert (e.g., transcode) the received data into another streamable format that can be processed by the user device (e.g., by a television tuner of the user device 110, 112). Alternatively, streaming client 125 may play the streamed data in the received format.

In one embodiment, user device 116 includes a converter 132. User device 116 may receive a full file in an initial format that is not renderable on the user device 116 from server system 105. The initial format may be a layout agnostic format that does not have any predetermined page layout and/or number of pages. For example, user device 116 may receive an electronic publication in a format such as the ePub®, AZW, Mobi® 7, Mobi 8 or comic book archive file (CBR) format. The converter 132 may then convert the received contents of the electronic publication into a format that can be displayed on the user device 116 (e.g., into an MPEG streaming video format).

The server system 105 may include one or more machines (e.g., one or more server computers, routers, gateways, etc.) that have processing and storage capabilities to provide server-based functionality. The server system 105 may be implemented by a single machine or a cluster of machines, each of which may include data stores and/or other data processing equipment. In one embodiment, the server system 120 includes one or more cloud based servers, which may be hosted, for example, by cloud based hosting services such as Amazon's® Elastic Compute Cloud® (EC2).

The server system 105 includes a server 135, which may provide network-accessible server-based functionality. In one embodiment, the server 235 provides electronic publications to user devices 110-116 upon the user devices 110-116 accessing a media store 140 provided by the server 135. The user devices 110-116 may access the media store 140, for example, by navigating to particular web pages and selecting electronic publications for purchasing, renting, viewing, etc. The server system 105 delivers, and the user devices 110-116 receive, electronic publications that may include web pages, ebooks, and/or other electronic publications via the network 106.

In one embodiment, server system 105 includes a converter 130. Converter 130 is configured to transcode or otherwise convert electronic publications from formats that are not renderable on a user device (e.g., EPUB, MOBI, AZW, PDF, Visio, hypertext markup language (HTML), extensible HTML (XHTML), Powerpoint®, Word®, etc.) into streamable formats (e.g., Flash, ATSC, MPEG-2, MPEG-4, etc.). In one embodiment, converter 130 transcodes the electronic publication from the first format into the second format. This may be a two step process, in which an original data file is decoded into an intermediate uncompressed format, and then re-encoded into a target format. Alternatively, the original data file may be transcoded into the target format without first converting it into an intermediate format. The conversion may also be performed using any other techniques for converting between two formats, some examples of which are provided herein.

The original format of the electronic publication may be a non-streamable format, and the streamable format into which the electronic publication is converted may be a streaming video format. Converter 130 may perform such converting (e.g., transcoding) in response to server 135 receiving a request by a user device 110-116 to access a digital publication (e.g., on-the-fly). Alternatively, converter 130 may convert electronic publications and store the transcoded electronic publications in advance of receiving any requests to stream the electronic publications. In one embodiment, converter 130 is a component of server 135. Alternatively, converter 130 may be a distinct component from server 135, and may be hosted by the same or different machines that host server 135.

Figure 2:
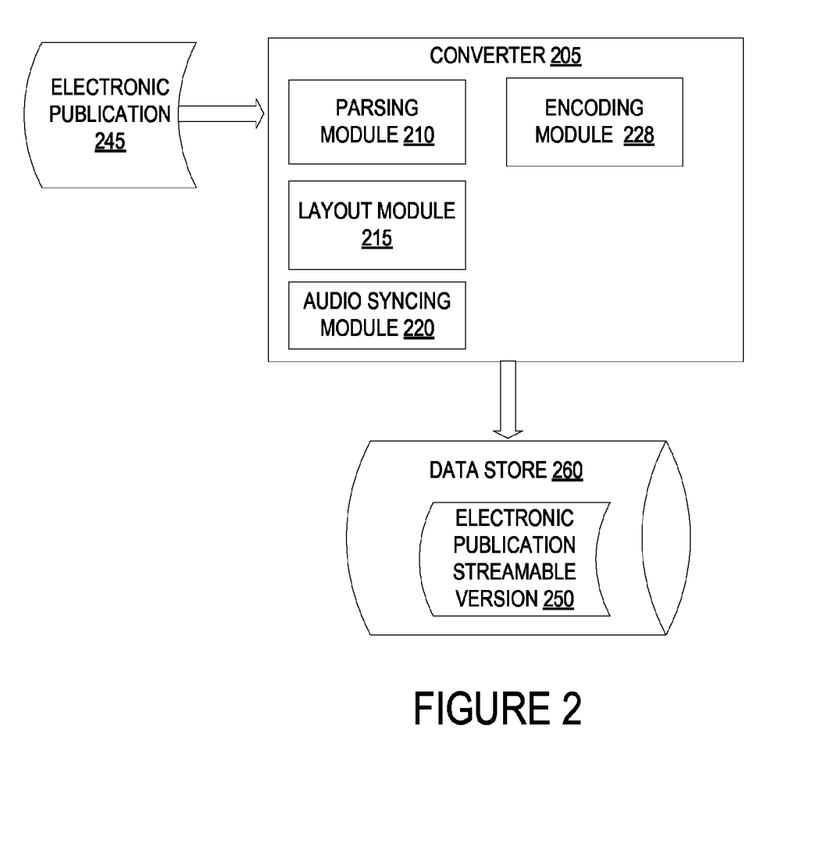
FIG. 2 is a block diagram of one embodiment of a converter.

FIG. 2 is a block diagram of one embodiment of a converter 205. In one embodiment, converter 205 corresponds to converter 130 of FIG. 1. Alternatively, converter 205 may correspond to converter 132 of FIG. 1. Converter 205 may include a parsing module 210, a layout module 215, an encoding module 228 and an audio syncing module 220. Alternatively, converter 205 may include more or fewer modules. Additionally, the functionality of one or more of the parsing module 210, encoding module 228, layout module 215 or audio syncing module 220 may be combined into a single module or may be subdivided into multiple modules.

Converter 205 may receive an electronic publication 245. In one embodiment, the received electronic publication 245 is formatted in an electronic publication format such as electronic publication (EPUB), Archos diffusion (AEH), broadband ebooks (BBeB), comic book archive file (CBR), compiled HM, eReader, FictionBook, hypertext markup language (HTML), XHTML, iBook, Kindle format 8 (KF8), Mobi 7, AZW, etc. Each electronic publication includes a series of tags and/or attributes. These may be, for example, HTML5 tags and cascading stylesheets (CSS) attributes. The tags may represent elements of the electronic document, including attribute, formatting and placement information for such elements (e.g., such as font information, relative positioning information, etc.), and so on. The attributes may describe presentation semantics (the look and formatting) of an electronic publication, such as layout, colors, fonts, etc. Different electronic publication formats provide different standards for the types of tags and attributes, contents of tags and attributes, tag and attribute syntax, and arrangement of tags and attributes in the electronic publications.

Parsing module 210 may parse an electronic publication that is to be converted into a streamable format. Parsing an electronic publication may include walking through the electronic document and identifying each tag and/or attribute in the electronic document, as well as the position of the tag or attribute in the electronic publication. For example, parsing module 210 may identify a byte offset of each element of the electronic publication, and may generate a hierarchical structure such as a tree that contains relational information about the elements.

In one embodiment, parsing the electronic document includes building a Document Object Model (DOM) tree from the identified tags. The parsing module 210 may generate a node in the DOM tree for each tag (or each tag pair) included in the electronic document. A tag pair includes an open tag and a close tag, both associated with a particular node. A DOM tree has at a root node that may represent a first element in the document. The DOM tree has additional nodes that are children of the root node, nodes that are children of those children nodes, and so on down to leaf nodes, which have no children. Nodes generated from tags that occur after a previous open tag and before the previous open tag's corresponding close tag are children of the node representing the previous open tag.

In one embodiment, the document parsing module 210 uses a counter to count the number of bytes that have been parsed. Each time a tag is encountered in the document, the parsing module 210 may record the byte count at the location in the document for that tag. The parsing module 210 may identify a byte offset within the electronic document for each tag. The parsing module 210 may add the byte offset information for a tag to an appropriate node of the DOM tree. Each node may be assigned a start byte offset and an end byte offset.

The layout module 215 determines one or more properties to apply to the electronic publication, such as font size, visual element criteria (e.g., image size restrictions), display width, display height, margins, text color, background color, line spacing, and so forth. Layout module 215 then determines a number of pages to divide the electronic publication into, and determines which elements belong on each page (paginates the electronic publication) based on the determined properties, the tags and the attributes. Page breaks may be placed based on the height (e.g., in pixels), width (e.g., in pixels) and/or resolution (e.g., in pixels) of a display. In one embodiment, each page break is the closest allowed break point to the display height. The page breaks may be placed such that, for each page, the display shows a maximum amount of content (e.g., text, images, tables, or other elements) without cutting off any visual element (e.g., any line of text, picture, table, etc.). In one embodiment, a vertical start offset and a vertical end offset for each page is recorded. This information may be recorded in a vector format and associated with or attached to the layout. Generating the layout may include generating a separate page layout for each page of the electronic publication.

In one embodiment, layout module 215 rescales visual elements such as tables and images if those visual elements fail to satisfy visual element criteria. The criteria may include a minimum width threshold, a maximum width threshold, a minimum height threshold, a maximum height threshold, or other criterion. For example, the electronic publication may include an image that is too tall to be completely displayed in a user device's display. If this occurs, then the image may be shrunk to fit in the display. The vertical and horizontal dimensions of the visual element may be rescaled an equal amount to maintain an aspect ratio of the visual element. Alternatively, the horizontal and vertical dimension of the element may be rescaled by different amounts (e.g., the horizontal dimension may be rescaled without adjusting the vertical dimension).

Encoding module 228 encodes the pages into a streamable format. In one embodiment, encoding module 228 encodes each page into a frame of a streaming video format (e.g., into an MPEG-2 frame, an MPEG-4 frame, a Flash frame, a Quicktime frame, etc.). Alternatively, encoding module 228 may encode two consecutive pages in each frame. These two pages may be displayed side-by-side in the frame, so that one page would appear to the right of the other page in the frame. This may be appropriate, for example, for resolutions of 1920×1080 or 1280×720, as found on high definition wide screen televisions. The encoding module 228 may arrange the frames into a single file, such as an MPEG-2 file, a Flash file, etc. For an MPEG file, each frame may have a header, and the file may have a footer that contains a sequence end code. Images in the file and audio in the file may be compressed using video and/or audio codecs. The file, which is a streamable version of the electronic publication 250, may then be stored in a data store 260 (e.g., a memory, disk drive or other storage). After the converting, the electronic publication is ready for streaming.

In one embodiment, encoding module 228 associates a transition time property with each frame. The transition time property identifies how long a particular frame should be displayed before a subsequent frame is displayed. In one embodiment, the transition time property is calculated based on an amount of time that it takes to read a page of the electronic publication. A separate display time property may be computed for each page. Alternatively, an average display time property may be computed for the electronic publication, and may be applied to all pages. In one embodiment, converter 205 receives statistical data identifying average reading times for the electronic publication. These average reading times may have been gathered from user devices on which users were reading the electronic publication. In another embodiment, converter 205 computes an average reading time for the user based on reading speeds of similar texts for the user. Alternatively, converter 205 may define a transition time for a page based on a number of words that the page contains.

Rather than using a transition time property, encoding module 228 may control the amount of time that a particular page is displayed on a screen by generating multiple copies of the pages. For example, Encoding module 220 may generate 20 frames that each include the same page of the electronic publication. The number of frames generated may be based on the amount of time that encoding module 228 determines that the pages should be displayed. For example, the standard frame rate for television and movies is 24 frames per second. If a page is to be displayed for 10 seconds, then 240 frames may be generated for the same page. These 240 frames may then be compressed into a size of little more than a single frame for transmission.

Once a streamable version 250 of the electronic publication is generated, encoding module 228 may store the streamable version 250 in a data store 210. The streamable version 250 may be an additional set of data that is stored together with the original version of the electronic publication 245. Note that rather than converting and storing the electronic publication, converter 205 may alternatively convert the electronic publication in response to receiving a request to access the electronic publication.

In one embodiment, audio syncing module 220 associates audio clips with the pages of the electronic publication. The audio clips may be based on an audio version of the electronic publication, and may be provided by a publisher. The audio syncing module 220 may also use a text to speech processor to generate the audio clips for the pages of the electronic publication. Additionally, the audio may be or include editorial comments on the electronic publication. Encoding module 228 may encode the audio clips into the streamable format. Therefore, the audio clips may be streamed along with the pages of the electronic publication.

In one embodiment, converter 205 generates multiple streamable versions of an electronic publication. Each streamable version may be optimized for user devices having specific display properties and/or other properties. For example, a first streamable version may be generated for user devices with a high definition display, and a second streamable version may be generated for user devices with a standard definition display. Additionally, a third streamable version may be generated for user devices that include a streaming client.

After a streamable version (or multiple streamable versions) of the electronic publication has been generated, converter 205 may receive a command to resize the text of the electronic publication, to change a line spacing, to change margins, to change a text or background color, and/or to change other properties of the electronic publication. To change one or more properties of the electronic publication, layout module 215 may generate a new layout for the electronic publication, and encoding module 228 may re-encode the electronic publication.

Figure 3:
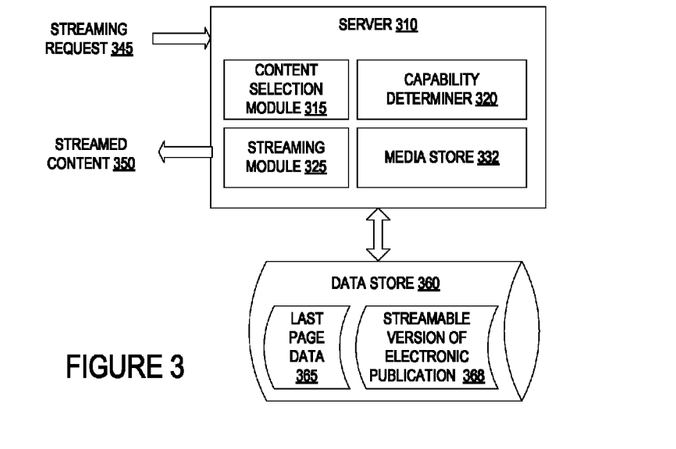
FIG. 3 is a block diagram of one embodiment of a streaming server.

FIG. 3 illustrates a block diagram of a server 310, in accordance with one embodiment of the present invention. In one embodiment, server 310 corresponds to server 135 of FIG. 1. In one embodiment, server 310 includes a content selection module 315, a streaming module 325, a capability determiner 320 and a media store 332. Alternatively, server 310 may include more or fewer modules. For example, server 310 may include converter 205 of FIG. 2. Additionally, the functionality of one or more of the content selection module 315, streaming module 325, capability determiner 320 and media store 332 may be combined into a single module or may be subdivided into multiple modules.

Media store 332 enables a user to purchase, rent, borrow or otherwise access electronic publications from the server 310. The media store 332 includes a data store that has a catalog of electronic publications. The catalog may include titles and descriptions of various electronic publications. Descriptions may take the form of item detail pages that identify information about the electronic publication such as a synopsis, author biography, reviews, price, and so forth. The media store 332 includes functionality allowing a user to search and browse though the publication catalog. When a user purchases or otherwise acquires an electronic publication via the media store 332 from a user device, the server 310 may invoke the streaming module 325 to deliver the electronic publication to the user device.

Capability determiner 320 determines capabilities of a user device from which a streaming request 345 is received. The determined properties may include display properties (e.g., resolution), supported video formats, supported audio formats, available bandwidth, etc. In one embodiment, a request from the user device identifies a type and/or specific model of the user device. Capability determiner 320 may use a lookup table or other data structure to determine capabilities of the identified type and/or model. Alternatively, capability determiner 320 may query the user device for its capabilities. Capability determine may also infer capabilities of the user device based on messages received from the user device. For example, capability determiner may be able to identify whether the user device is an internet protocol (IP) enabled television, a managed device such as a Roku® player, a set-to-box, a DVR, etc. Capability determiner 320 may additionally determine whether the user device is running a streaming client (described below).

Media store 332 may include multiple different streamable versions of an electronic publication. Each version may be optimized for display on user devices having particular properties (e.g., user devices with displays having particular resolutions). Content selection module 315 may select which streamable version of the electronic publication to use for the user device. Content selection module 315 may additionally determine which frames of the selected version of the electronic publication to initially send to the user device. In one embodiment, content selection module 315 selects frames that include a table of contents and frames that include first pages of each chapter of the electronic publication. Additionally, if a user of the user device has previously accessed the electronic publication, then content selection module 315 may determine what the last page read by the user was, and select this page and one or more subsequent pages.

Streaming module 325 transmits the selected content (e.g., frames) 350 to the user device. Content selection module 315 may continually select additional content (e.g., frames) 350 to send to the user device. Streaming module 325 may then transmit these frames to the user device. Therefore, frames containing next pages that the user is likely to want to read next may be streamed to the user device in advance of the user device displaying those frames. This may provide a smooth reading experience for the user.

Server 310 may receive a command from a user device requesting that one or more properties of the electronic publication be modified. For example, the user device may issue a command to increase a font size for the electronic publication or that a zoomed in view of an image be displayed. In response, server 310 may invoke the converter, and request that a new streamable version of the electronic publication be generated. Alternatively, a streamable version of the electronic publication having the requested properties may have previously been generated. Content selection module 315 may then determine which pages (e.g., which frames containing those pages) to send to the user device, and streaming module 325 may transmit those frames to the user device.

When the user device closes the electronic publication, the user device may send a last page read message to the server 310. Server 310 may then store the last page data 365 in a data store 360. In one embodiment, server 310 saves the byte offset of the tag or node associated with an upper left most element included in the last page read. Alternatively, server 310 may save a page number of a last page read. Therefore, when the user next wants to read the electronic publication, content selection module 315 may send the last page read and subsequent pages to the user device.

Figure 4:
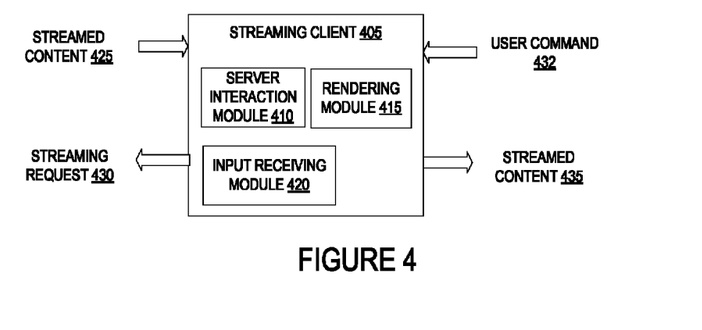
FIG. 4 is a block diagram of one embodiment of a streaming client.

FIG. 4 illustrates a block diagram of a streaming client 405, in accordance with one embodiment of the present invention. In one embodiment, streaming client 405 corresponds to streaming client 125 of FIG. 1. In one embodiment, streaming client 405 includes a server interaction module 410, a rendering module 415 and an input receiving module 420. Alternatively, streaming client 405 may include more or fewer modules. Additionally, the functionality of one or more of the server interaction module 410, rendering module 415 and input receiving module 420 may be combined into a single module or may be subdivided into multiple modules.

Input receiving module 420 receives user commands 432 from a user. For example, if the streaming client 405 is a module of a television, set top box or DVR, then input receiving module 420 may receive a user command 432 in response to a user pressing a button or series of buttons on a remote control. If the streaming client 405 is a module of, for example, a mobile phone with a touchscreen, then the streaming client 405 may receive user commands 432 based on user interaction with the touchscreen. User commands 432 may be commands to select a particular electronic publication, commands to begin viewing a selected electronic publication, commands to pause playing of the electronic publication, commands to change pages, commands to change layout properties, and so forth.

Depending on a received user command 432, streaming client 405 may perform one or more operations locally (e.g., pausing or un-pausing an electronic publication, changing pages of the electronic publication, etc.), or may forward the commands on to a server. In one embodiment, server interaction module 410 issues commands (e.g., a streaming request 430) to the server, and receives responses and/or streamed content 425 from the server. In response to input receiving module 420 receiving a command to begin viewing an electronic publication, server interaction module 410 may forward a streaming request 430 to the server. The server may then begin streaming streamed content 425 to streaming client 405.

In one embodiment, streaming client 405 receives streamed content 425 in a format that is not natively supported by a device on which streaming client executes. For example, streamed content 425 may be received in a flash format, but streaming client 405 may be a module in a television that supports ATSC. In such an embodiment, encoding module 415 may convert the streamed contents 435 into another format that is supported by the device on which the streaming client 405 executes. For example, encoding module 415 may decode the streamed content 435, and then re-encode the streamed content into an ATSC format.

Once the streamed content 425 is in a format that is supported by the device, rendering module 422 may output the new version of the streamed content 435 to a display of the device. In one embodiment, rendering module 422 streams the streamed content 435 to an input of the device. The device may then play the streamed content 435 as it would any video or movie.

Figure 5:
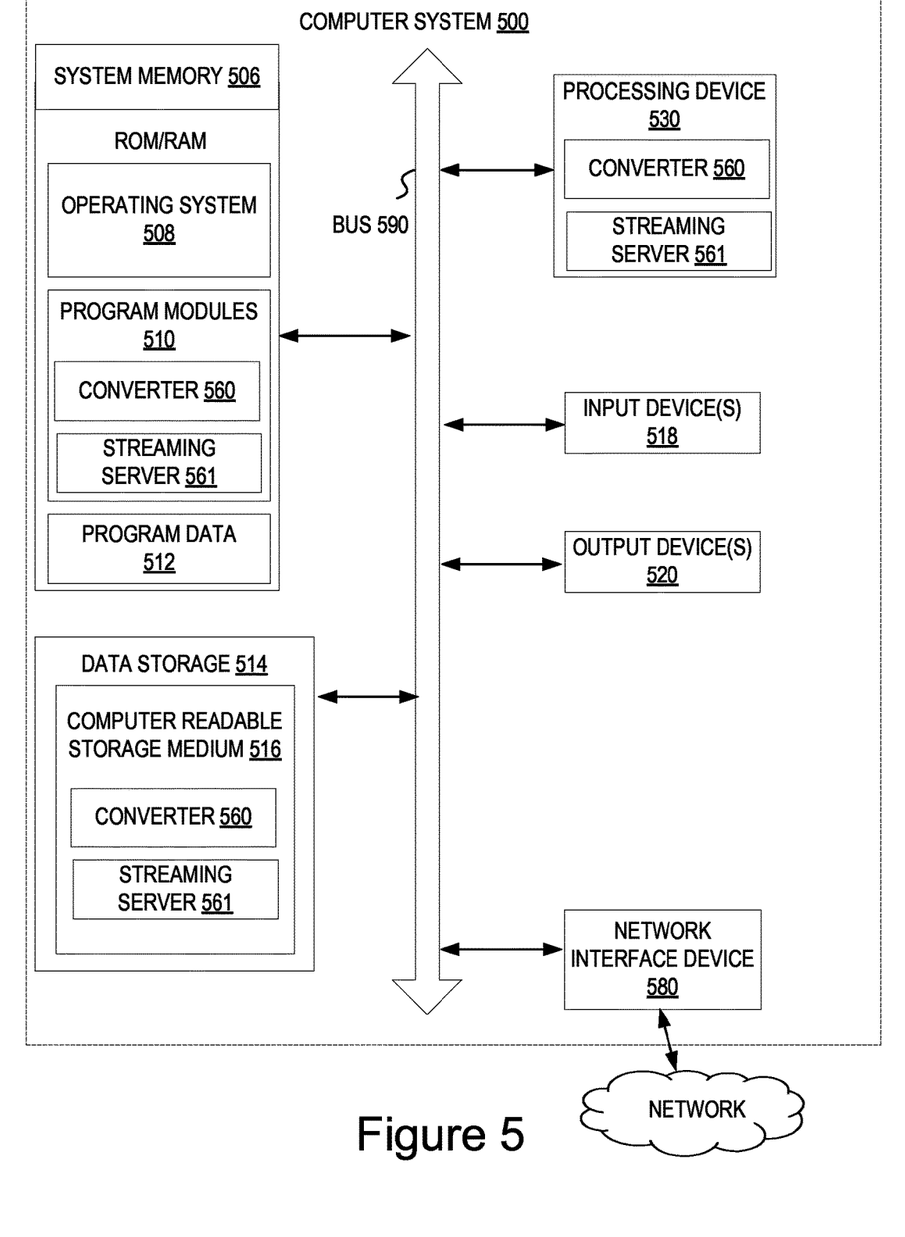
FIG. 5 is a block diagram illustrating an exemplary computer system, in accordance with one embodiment of the present invention.

FIG. 5 is a block diagram illustrating an exemplary computer system 500 configured to perform any one or more of the methodologies performed herein. Computer system 500 may be any type of computing device such as an electronic book reader, a PDA, a mobile phone, a laptop computer, a portable media player, a tablet computer, a camera, a video camera, a netbook, a desktop computer, a gaming console, a DVD player, a television, a computing pad, a media center, a rackmount server, a desktop computer, a network router, switch or bridge, or any other computing device. In one embodiment, the computer system 500 corresponds to a machine of the server system 105 of FIG. 1. Alternatively, the computer system may correspond to a user device 110-116 of FIG. 1.

The computer system 500 may operate in the capacity of a server or a client machine in client-server network environment, or as a peer machine in a peer-to-peer (or distributed) network environment. Further, while only a single machine is illustrated, the computer system 500 shall also be taken to include any collection of machines that individually or jointly execute a set (or multiple sets) of instructions to perform any one or more of the methodologies discussed herein.

The computer system 500 includes a processing device 530, which may include one or more general-purpose processors such as central processing units (CPUs), microcontrollers, microprocessors, systems on a chip (SoC), or the like. The processing device 530 may further include dedicated chipsets, application specific integrated circuits (ASIC), field programmable gate arrays (FPGA), digital signal processors (DSP), network processors, or the like. The user device 500 also includes system memory 506, which may correspond to any combination of volatile and/or non-volatile storage mechanisms. The system memory 506 stores information which may provide an operating system component 508, various program modules 510 such as converter 560 and streaming server 561 (which may correspond to converter 205 and server 310, respectively), program data 512, and/or other components. The computer system 500 may perform functions by using the processing device(s) 530 to execute instructions provided by the system memory 506. Such instructions may be provided as software or firmware. Alternatively, or additionally, the processing device(s) 530 may include hardwired instruction sets. The processing device 530, system memory 506 and additional components may communicate via a bus 590.

The computer system 500 may also include a data storage device 514 that may be composed of one or more types of removable storage and/or one or more types of non-removable storage. The data storage device 514 includes a computer-readable storage medium 516 on which is stored one or more sets of instructions embodying any one or more of the methodologies or functions described herein. As shown, instructions for a converter 560 and/or streaming server 561 may reside, completely or at least partially, within the computer readable storage medium 516, system memory 506 and/or within the processing device(s) 530 during execution thereof by the computer system 500, the system memory 506 and the processing device(s) 530 also constituting computer-readable media. Additionally, instructions for a streaming client (not shown) may reside in the computer readable storage medium, system memory 506 and/or processing devices 530.

While the computer-readable storage medium 516 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The user device 500 may also include one or more input devices 518 (keyboard, mouse device, specialized selection keys, etc.) and one or more output devices 520 (displays, printers, audio output mechanisms, etc.). Computer system 500 may additionally include a network interface device 580 such as a network interface card (NIC) or wireless modem to connect to a network. The network interface device 580 may provide network connectivity using any type of wired or wireless network technology including, for example, Ethernet, Firewire, universal serial bus (USB), Thunderbolt, cellular digital packet data (CDPD), general packet radio service (GPRS), enhanced data rates for GSM evolution (EDGE), universal mobile telecommunications system (UMTS), 1 times radio transmission technology (1×RTT), evaluation data optimized (EVDO), high-speed down-link packet access (HSDPA), WiFi, long term evolution (LTE), worldwide interoperability for microwave access (Wi-MAX), etc.

FIGS. 6-10 are flow diagrams of various embodiments for methods of converting an electronic publication and/or streaming the converted electronic publication to a user device. The methods are performed by processing logic that may comprise hardware (circuitry, dedicated logic, etc.), software (such as is run on a general purpose computer system or a dedicated machine), or a combination of both. In one embodiment, the methods are performed by a server system 105 of FIG. 1.

Figure 6:
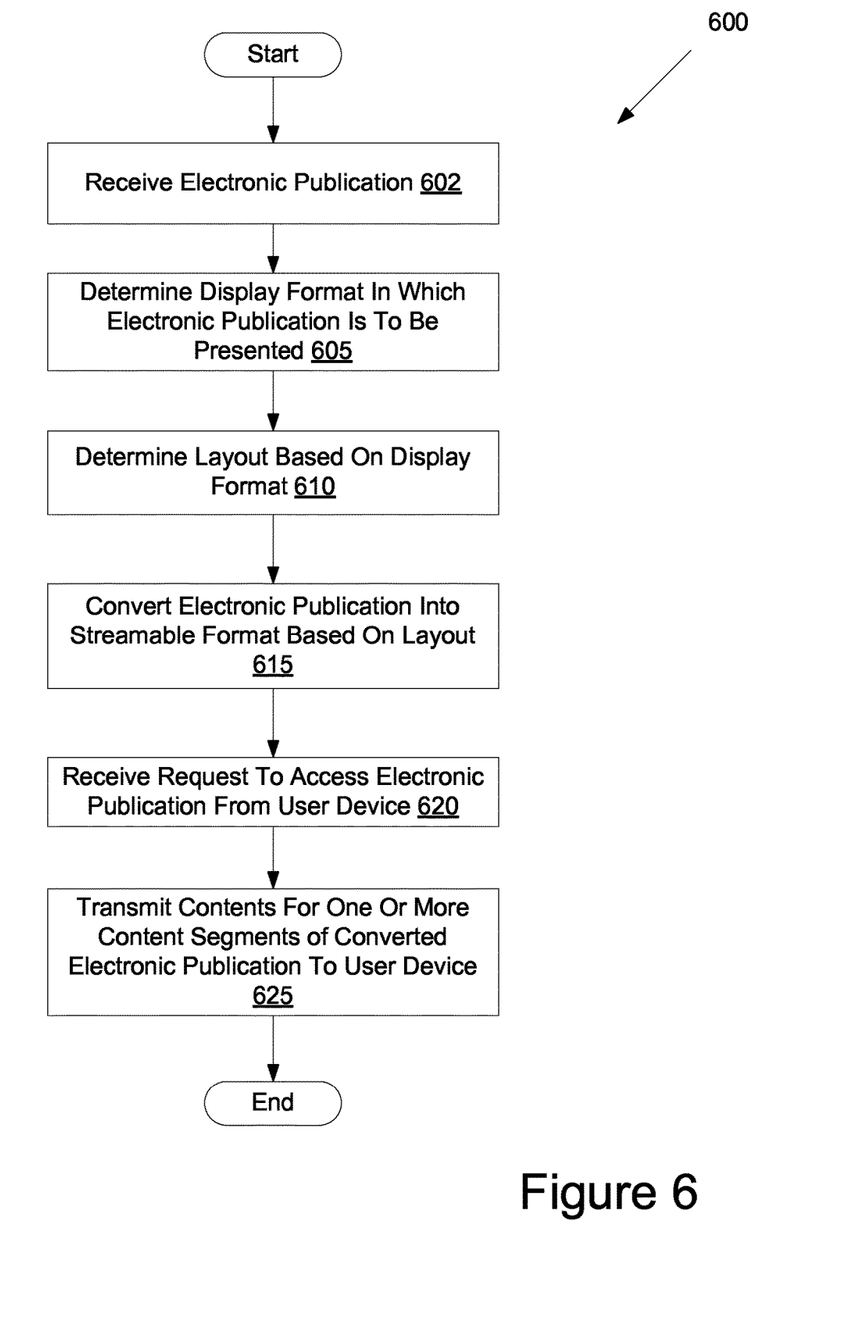
FIG. 6 is a flow diagram of one embodiment for a method of converting an electronic publication and streaming the converted electronic publication to a user device.

FIG. 6 is a flow diagram illustrating one embodiment for a method 600 of converting an electronic publication and streaming the converted electronic publication to a user device. At block 602 of method 600, processing logic receives an electronic publication. The electronic publication may be received from a publisher, may be retrieved from storage, or may be received from another source. At block 605, processing logic determines a display format in which the electronic publication will be presented. The display format may be an MPEG format, an ATSC format, a Flash format, and so on. The display format may include a display resolution, a display width, a display height, display colors, and so forth. The display format may be based on a type of device on which the electronic publication will be presented (e.g., a standard definition television, a high definition television, etc.).

At block 610, processing logic determines a layout based on the determined display format. Generating the layout may include determining where page breaks can be assigned without cutting off any visual elements of the document, and assigning page breaks to one or more of the locations where page breaks can occur based on a viewport height. This may include dividing the electronic publication into multiple content segments, and determining individual layouts for each of those content segments (e.g., determining page layouts for each page of the electronic publication). Page layouts may designate font size, margin size, image placement, and so forth.

At block 615, processing logic converts the electronic publication into a streamable format based on the layout. This may include generating a separate frame for each content segment (e.g., page) based on the individual layout for that content segment or generating frames that each include two or more content segments. Each frame may be encoded as a frame of a streaming video format (e.g., as a Flash frame, an MPEG-2 frame, a Quicktime frame, etc.).

At block 620, processing logic receives a request to access the electronic publication from a user device. The user device may be a device such as a television that is configured to receive videos in a specific video streaming format, and that is unable to render or display data that is configured other than in the specific video streaming format. Alternatively, the user device may be a device that is capable of receiving multiple different formats of media (e.g., in both fixed layout and layout agnostic formats, in both streamable and non-streamable formatted, etc). In such an instance, a user of the user device may have requested that the electronic publication be streamed to the user device. At block 625, processing logic transmits one or more content segments of the converted electronic publication to the user device. Processing logic may then continue to transmit contents for additional content segments of the converted electronic publication to the user device until an entirety of the electronic publication is sent to the user device or until a command to stop transmitting is received from the user device.

Figure 7:
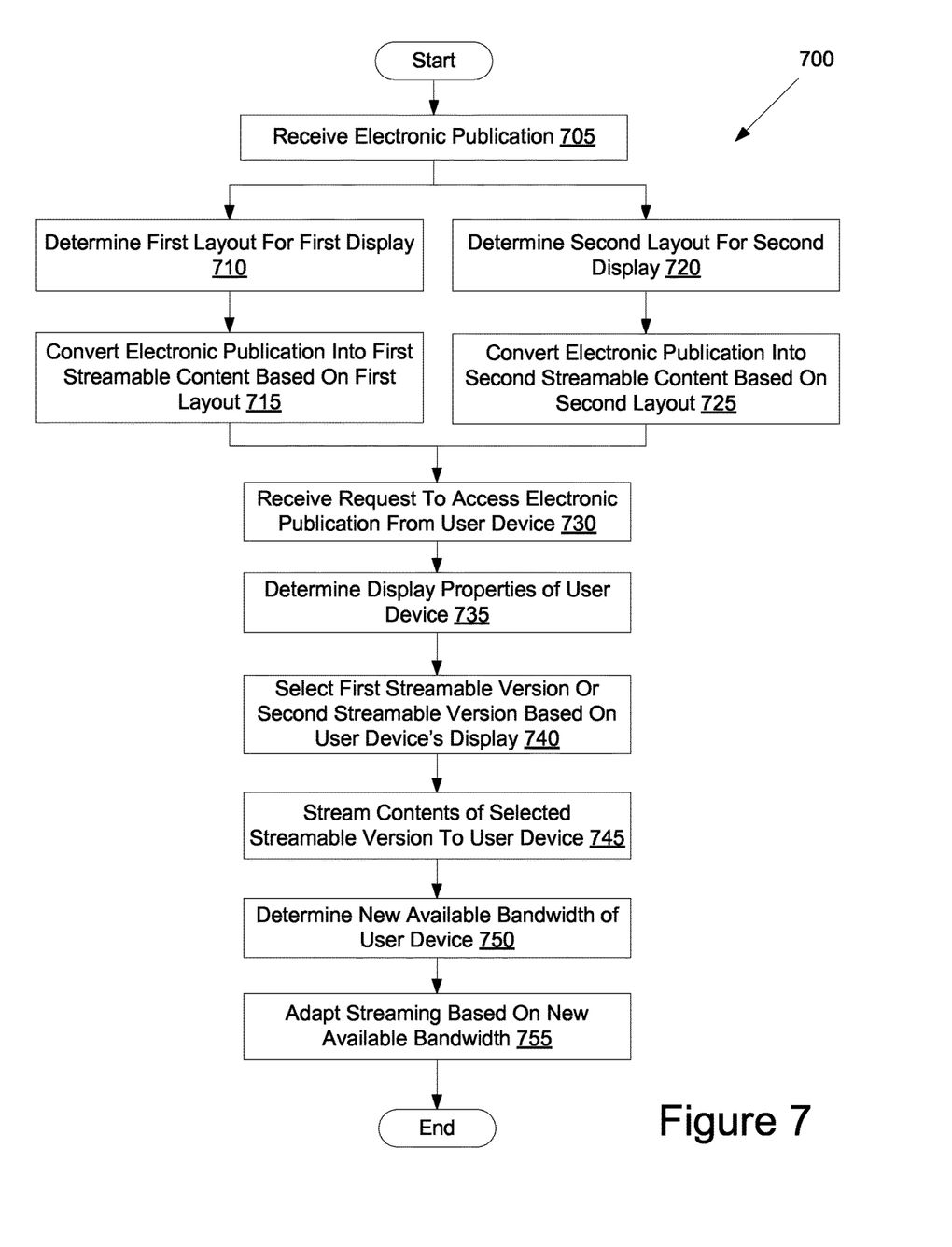
FIG. 7 is a flow diagram of another embodiment for a method of converting an electronic publication and streaming the converted electronic publication to a user device.

FIG. 7 is a flow diagram illustrating another embodiment for a method 700 of converting an electronic publication and streaming the converted electronic publication to a user device. At block 705 of method 700, processing logic receives an electronic publication. The received electronic publication may be in a layout agnostic format, may be in a format that is not renderable on some user devices, and/or may be in a non-streamable format.

At block 710, processing logic determines a first layout appropriate for a first display that the electronic publication may be presented on. This may include determining a resolution of the display, color capabilities of the display, formats supported by a device housing the display, and so on. At block 715, processing logic converts the electronic publication into a first streamable version based on the first layout. This may include determining the contents of multiple pages of the electronic document, and generating a separate frame for each page or collection of pages.

At block 720, processing logic may additionally determine a second layout appropriate for a second display that the electronic publication may be presented on. The second display may have a resolution of 420p, for example, while the first display may have a resolution of 1080p. At block 725, processing logic converts the electronic publication into second streamable version based on the second layout. The operations of blocks 720 and 725 may be performed in parallel to the operations of blocks 710 and 715 (as shown), or may be performed after the operations of blocks 710 and 715. Additionally, processing logic may determine additional layouts and generate additional converted versions of the electronic publication.

At block 730, processing logic receives a request to access the electronic publication from a user device. At block 735, processing logic determines properties of a display of the user device. For example, processing logic may determine a resolution of the user device. Processing logic may also determine a type of device that the user device is, whether the user device includes a streaming client and/or a bandwidth available to the user device. At block 740, processing logic selects the first streamable version or the second streamable version of the electronic publication based on the user device's display. At block 745, processing logic streams contents of the selected streamable version of the electronic publication to the user device.

In one embodiment, at block 750 processing logic determines a new available bandwidth of the user device. In response to detecting that the available bandwidth for the user device has changed, processing logic adapts streaming based on the new available bandwidth. For example, if the bandwidth increases, then processing logic may increase an amount of data (e.g., a number of frames) that is sent in each message. Alternatively, processing logic may reduce a buffer size used for the electronic publication. In contrast, if the available bandwidth is reduced, processing logic may reduce the payload (e.g., the number of frames) for messages and/or increase a buffer size.

Figure 8:
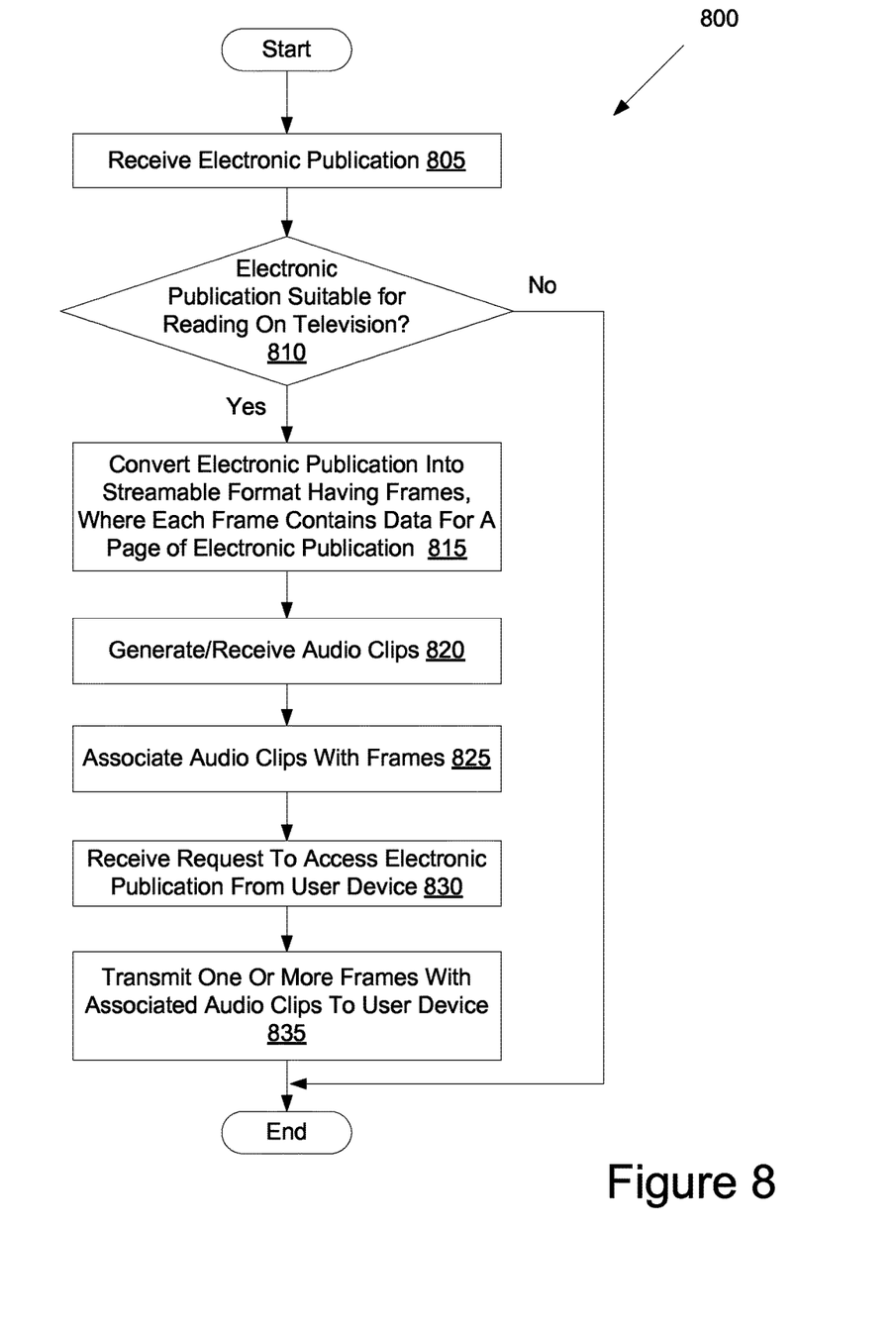
FIG. 8 is a flow diagram of still another embodiment for a method of converting an electronic publication and streaming the converted electronic publication to a user device.

FIG. 8 is a flow diagram illustrating yet another embodiment for a method 800 of converting an electronic publication and streaming the converted electronic publication to a user device. At block 805 of method 800, processing logic receives an electronic publication.

At block 810, processing logic determines whether the electronic publication is suitable for viewing on a television. Processing logic may apply one or more heuristics to determine whether the electronic publication is suitable for viewing on a television. Some heuristics may be image based heuristics, such as a total number of images in the electronic publication, a percentage of pages containing images, etc. Other heuristics may be text based heuristics, such as a total number of words in the electronic publication, an average number of words per page, and so forth.

Some electronic publications may include a tag that identifies the electronic publication as being approved for converting for viewing on a television. Electronic publications may also include tags identifying a category of the electronic publication. Processing logic may determine whether the electronic publication is appropriate for viewing on a television based on these tags. For example, children's books, travelogs, comic books, cookbooks, fixed page layout books, and the like may be suitable for viewing on a television. In contrast, novels may not be suitable for viewing on a television. If the electronic publication is suitable for viewing on a television, then the method continues to block 815. Otherwise, the method ends.

At block 815, processing logic converts the electronic publication into a streamable format. This may include generating a separate frame for each page (or pair of pages) based on the page layout for that page (or pair of pages). Each frame may be encoded as a frame of a streaming video format (e.g., as a Flash frame, an MPEG-2 frame, a Quicktime frame, etc.). The frames may be packaged into a single compressed file, such as an MPEG-2 file.

At block 820, processing logic generates or receives audio content such as clips for the electronic publication. In one embodiment, the audio clips are received from a same source as the electronic publication (e.g., from a publisher). The received audio clips may be spoken versions of printed text included in the electronic publication and/or may be an editorial audio track that is associated with the electronic publication. The audio clips may also be generated by processing the electronic publication using a text to speech processor.

At block 825, processing logic associates audio clips with the generated frames. Each audio clip may match the text that is included in a particular frame. Therefore, when played, the audio clip may dictate the displayed text.

At block 830, processing logic receives a request to access the electronic publication from a user device. At block 835, processing logic transmits one or more frames of the converted electronic publication along with associated audio clips to the user device.

Figure 9:
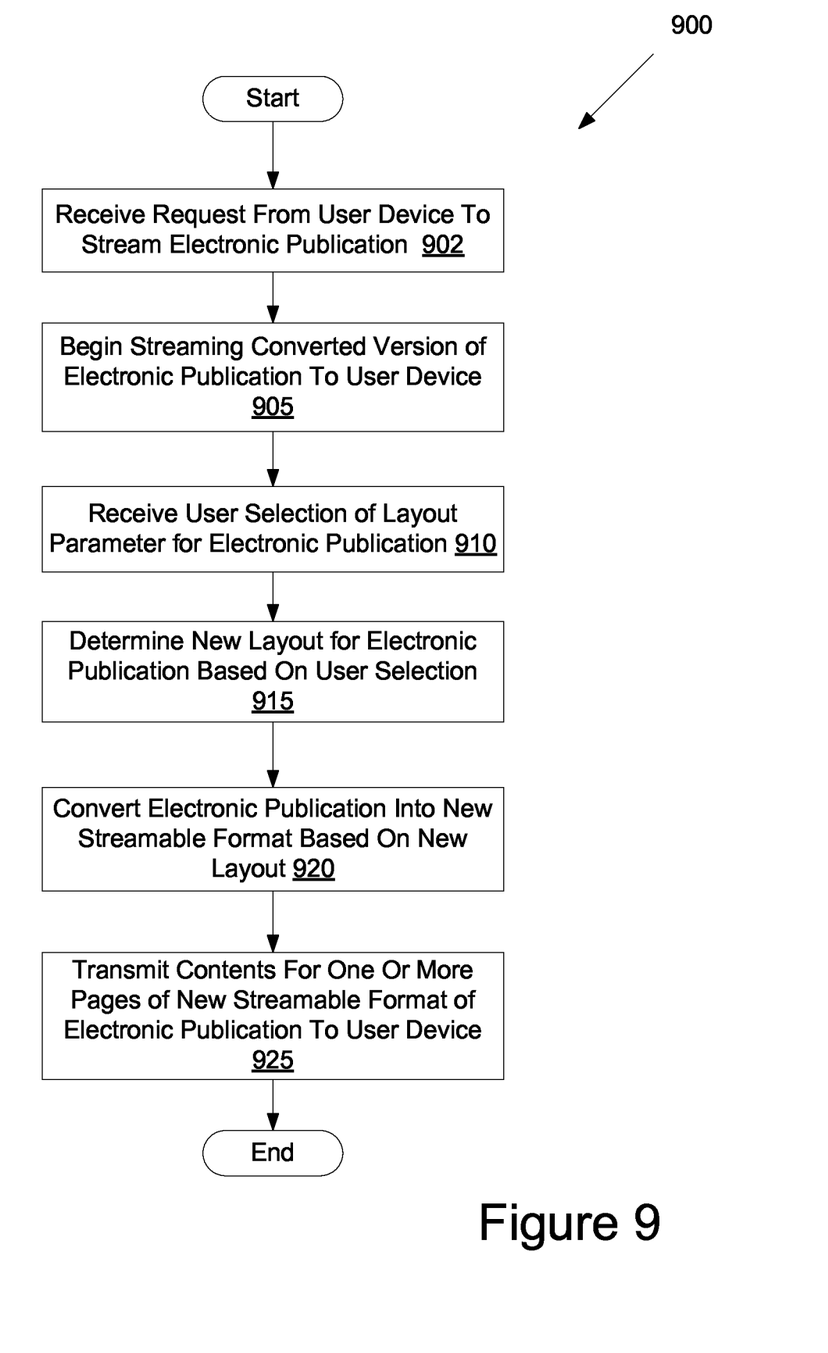
FIG. 9 is a flow diagram of still yet another embodiment for a method of converting an electronic publication and streaming the converted electronic publication to a user device.

FIG. 9 is a flow diagram illustrating still yet another embodiment for a method 900 of converting an electronic publication and streaming the converted electronic publication to a user device. At block 902 of method 900, processing logic receives a request from a user device to stream an electronic publication.

At block 905, processing logic begins streaming a converted version of the electronic publication to the user device. The electronic publication may have previously been converted into a streamable format that is supported by the user device.

At block 910, processing logic receives a user selection of a layout parameter for the electronic publication. The selection may be for a new font size, a new text color, a new background color, a new line spacing, a new font type, a new margin size, a new resolution, or any other property whose change will affect how visual elements are displayed.

At block 915, processing logic determines a new layout for the electronic publication based on the user selection. This may include re-paginating the electronic publication and generating a new page layout for each page. At block 920, processing logic converts the electronic publication into a new streamable format based on the new layout (e.g., re-transcodes the electronic publication). At block 925, processing logic then transmits contents for one or more pages of the new streamable format for the electronic publication to the user device.

In one embodiment, processing logic records a byte offset for a tag associated with an element in the electronic document that is located at the upper left of the current page at the time that the request to change the property is received. This is assuming that text is read from left to write, and top to bottom. If text were read, for example, from right to left (e.g., as with some Japanese text), then the byte offset of the tag associated with the upper right of the current page may be saved. Processing logic may then determine a page of the re-converted version of the electronic publication that corresponds to the same element, and send that page to the user device. Therefore, the user may continue reading from the same position that he was at when he requested the property change.

Figure 10:
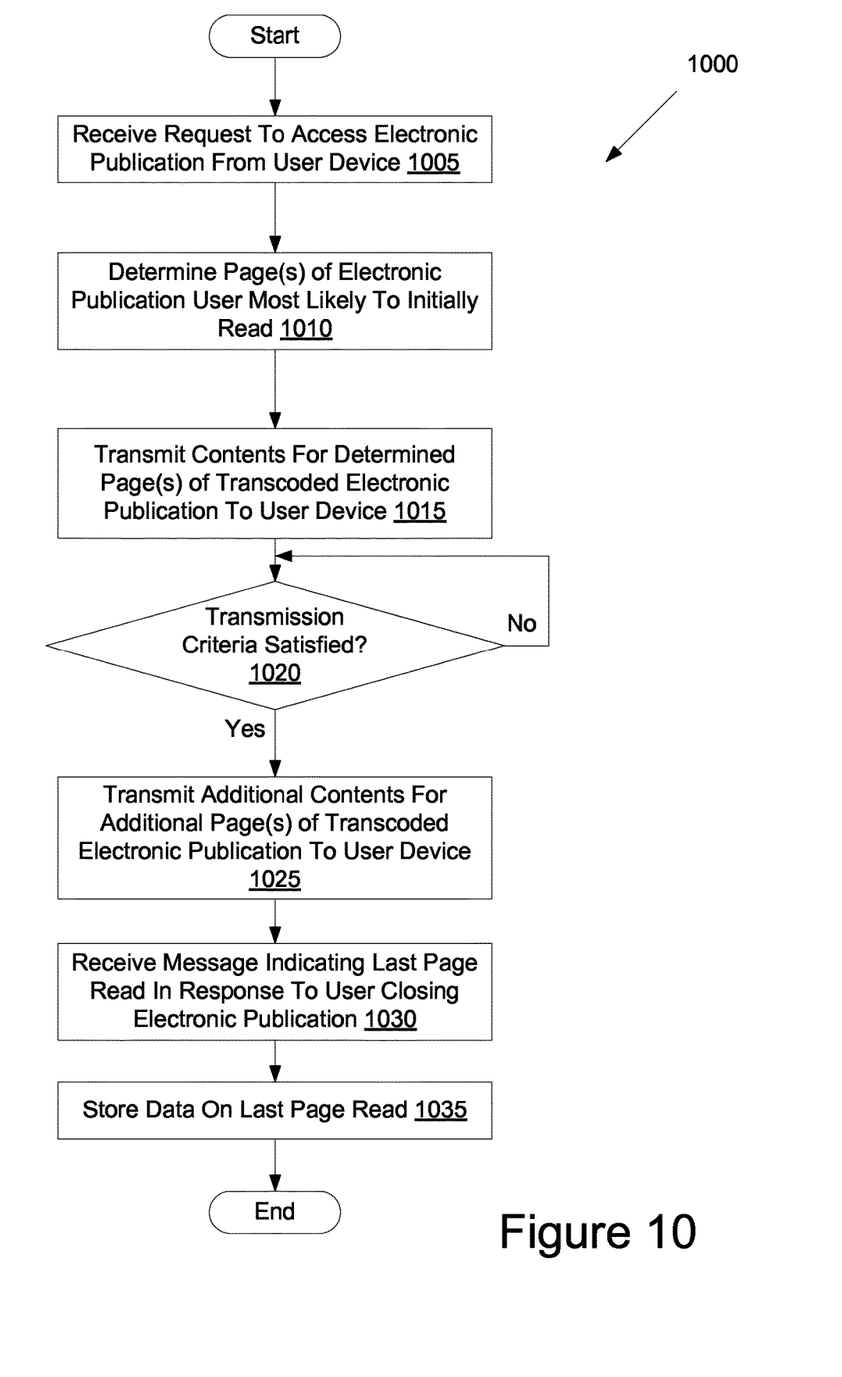
FIG. 10 is a flow diagram of one embodiment for a method of streaming a converted electronic publication to a user device.

FIG. 10 is a flow diagram illustrating one embodiment for a method 1000 of streaming a converted electronic publication to a user device. At block 1005 of method 1000, processing logic receives a request to access an electronic publication from a user device.

At block 1010, processing logic determines one or more pages of the electronic publication that are most likely to be initially read by a user of the user device. The determined pages may include a first page of the electronic publication, the pages of a table of contents, and the first page of each chapter, for example. If the user has read the electronic publication before and has favorite pages, then the determined pages may include those favorite pages. Additionally, the determined pages may include a last page that was read by the user. These pages may be identified as portions of the electronic publication that are for initial display.

At block 1015, processing logic transmits contents for the determined page or pages of the converted electronic publication to the user device. In one embodiment, processing logic determines a location of the streamable version that includes the pages/portions of the electronic publication that have been identified for initial display, and transmits the electronic publication starting at the location. At block 1020, processing logic determines whether a transmission criterion is satisfied. The transmission criterion may include a time limit, a change page command, or other criterion. If the transmission criterion is satisfied, then the method continues to block 1025, and processing logic transmits additional contents for one or more additional pages of the converted electronic publication to the user device. If no transmission criteria are satisfied, the method returns to block 1020.

At block 1030, processing logic receives a message indicating a last page that was read by the user in response to the user closing the electronic publication. Alternatively, processing logic may detect that a connection to the user device has terminated, and may determine a last page that was sent to the user device. At block 1035, processing logic stores data indicating the last page read by the user. Therefore, if the user accesses the electronic publication again (whether from the user device or from a different user device), processing logic may send the user device (or different user device) the last page read.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "generating", "computing", "painting", "scanning", "identifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving an electronic publication in an electronic publication format, the electronic publication comprising a plurality of visual elements;
   determining, by a processing device, a display format in which the electronic publication is to be presented on a user device;
   dividing the electronic publication into a plurality of content segments based on the display format and determining a layout for a first content segment of the plurality of content segments based on the display format, wherein determining the layout comprises associating locations in the electronic publication with breaks between the content segments such that the visual elements of the first content segment satisfy visual element criteria of the determined display format;
   converting, by the processing device, the electronic publication into a first video format that is able to be rendered on the user device by encoding each content segment into a corresponding individual video frame;
   determining an average transition time to be associated with each individual video frame, the transition time to indicate a period of time for which each individual video frame is to be displayed during playback, wherein the period of time represents an expected average amount of time for a user to read a content segment, and is determined using an average number of words in each content segment and a reading speed corresponding to the electronic publication;
   receiving a request to access the electronic publication from the user device; and transmitting the individual video frame to the user device for display for the average transition time.

2. The method of claim 1, wherein the user device comprises at least one of a television, a set-top box or a digital video player.

3. The method of claim 1, further comprising:
   converting the electronic publication into a second video format suitable for displaying on displays having second display properties;
   determining that display properties for the user device correspond to the second display properties; and
   transmitting the one or more frames corresponding to the second video format.

4. The method of claim 1, further comprising:
   receiving a user selection of a layout parameter for the electronic publication;
   determining a new layout for the electronic publication based on the user election;
   dividing the electronic publication into a plurality of new content segments based on the new layout; and
   converting the electronic publication into the first video format by encoding the plurality of new content segments into a plurality of new frames.

5. The method of claim 1, further comprising:
   associating audio content with the one or more frames; and
   transmitting the audio content associated with the one or more frames to the user device, wherein the user device plays the audio content while displaying the one or more frames.

6. A non-transitory computer readable storage medium having instructions that, when executed by a processing device, cause the processing device to perform a method comprising:
receiving an electronic publication in an electronic publication format, the electronic publication comprising a plurality of visual elements;
determining, by the processing device, a display format in which the electronic publication is to be presented on a user device;
determining, by the processing device, a layout for a first content segment of a plurality of content segments in the electronic publication based on the display format, wherein determining the layout comprises associating locations in the electronic publication with breaks between the content segments such that the visual elements of the first content segment satisfy visual element criteria of the determined display format;
converting, by the processing device, the electronic publication into a first video format comprising a plurality of frames based on the layout, wherein the first video format is able to be rendered on the user device;
determining an average transition time to be associated with each of the plurality of frames, the transition time to indicate a period of time for which each frame is to be displayed during playback, wherein the period of time represents an expected average amount of time for a user to read a content segment and is determined using an average number of words in each content segment and a reading speed corresponding to the electronic publication; and
providing the first frame of the plurality of frames in the first video format to the user device for playback for the average transition time.

7. The non-transitory computer readable storage medium of claim 6, wherein determining the layout for the electronic publication comprises determining display parameters in which the electronic publication will be presented, and converting the electronic publication into the first video format comprises transcoding the electronic publication into the first video format based, at least in part, on the determined display parameters.

8. The non-transitory computer readable storage medium of claim 6, wherein determining the layout of the electronic publication comprises:
selecting a page width and a page height based on display parameters of the user device; and
dividing the electronic publication into a plurality of content segments, wherein each of the plurality of content segments comprises a page having the page width and the page height.

9. The non-transitory computer readable storage medium of claim 8, wherein:
converting the electronic publication comprises generating a plurality of frames of the electronic publication, wherein each frame of the plurality of frames corresponds to at least one content segment of the plurality of content segments; and
providing the electronic publication in the first video format comprises transmitting one or more frames of the plurality of frames.

10. The non-transitory computer readable storage medium of claim 6, wherein the first video format is suitable for displaying on displays having first display properties, the method further comprising:
converting the electronic publication into a second video format suitable for displaying on displays having second display properties determining that display properties for the user device correspond to the second display properties; and
providing the electronic publication in the second video format to the user device.

11. The non-transitory computer readable storage medium of claim 6, the method further comprising:
receiving a user selection of a layout parameter for the electronic publication;
determining a new layout for the electronic publication based on the user election; and
converting the electronic publication into a new video format based on the new layout.

12. The non-transitory computer readable storage medium of claim 11, wherein the layout parameter comprises at least one of a font size, a margin size, a background color, a text color or a line spacing.

13. The non-transitory computer readable storage medium of claim 6, the method further comprising:
determining an available bandwidth for the user device; and
adapting the providing based on the available bandwidth.

14. The non-transitory computer readable storage medium of claim 6, the method further comprising:
associating audio content with one or more pages of the electronic publication in the first video format, wherein the providing comprises transmitting the one or more pages and the audio content to the user device.

15. The non-transitory computer readable storage medium of claim 6, wherein providing the electronic publication in the first video format comprises at least one of broadcasting or unicasting the electronic publication in the first video format.

16. The non-transitory computer readable storage medium of claim 6, the method further comprising:
identifying one or more portions of the electronic publication for initial display;
selecting a location within the electronic publication in the first video format corresponding to the one or more portions; and
providing the electronic publication in the first video format starting at the selected location.

17. A computing apparatus, comprising:
a memory to store instructions for a converter; and
a processing device, coupled to the memory, to execute the instructions for the converter, wherein the processing device is configured to:
receive an electronic publication in an electronic publication format, the electronic publication comprising a plurality of visual elements;
determine a display format in which the electronic publication is to be presented on a user device;
determine a layout for a first content segment of a plurality of content segments in the electronic publication based on the display format, wherein to determine the layout, the processing device to associate locations in the electronic publication with breaks between the content segments such that the visual elements of the first content segment satisfy visual element criteria of the determined display format;
convert the electronic publication into a first video format comprising a plurality of frames based on the layout, wherein the first video format is able to be rendered on the user device; and
determine an average transition time to be associated with each of the plurality of frames, the transition time to indicate a period of time for which each frame is to be displayed during playback, wherein the period of time represents an expected average amount of time for a user to read a content segment and is determined using an average number of words in each content segment and a reading speed corresponding to the electronic publication.

18. The computing apparatus of claim 17, wherein the processing device is further configured to:
    receive a request to access the electronic publication from a user device; and
    transmit contents for one or more content segments of the electronic publication in the first video format to the user device.

19. The computing apparatus of claim 17, wherein to convert the electronic publication the processing device will generate a plurality of frames of the electronic publication, each frame comprising contents for at least one content segment of the electronic publication, and create a file containing the plurality of frames.

20. The computing apparatus of claim 17, wherein each of the one or more content segments corresponds to a page of the electronic publication.

21. The computing apparatus of claim 17, wherein the layout is suitable for displaying on displays having first display properties, and wherein the processing device is further configured to:
    determine a second layout suitable for displaying on displays having second display properties; and
    convert the electronic publication into a second video format based on the second layout.

22. The computing apparatus of claim 17, wherein the processing device is further configured to:
    receive a user selection of a layout parameter for the electronic publication;
    determine a new layout for the electronic publication based on the user selection; and
    convert the electronic publication into a new video format based on the new layout.

23. The computing apparatus of claim 17, wherein the processing device is further configured to:
    associate audio with one or more pages of the electronic publication in the first video format, wherein the audio will be transmitted to user devices along with the one or more pages.

24. The computing apparatus of claim 17, wherein the processing device is further configured to:
    identify one or more portions of the electronic publication for initial display;
    select a location within the electronic publication in the first video format corresponding to the one or more portions; and
    provide the electronic publication in the first video format starting at the selected location.

* * * * *